Jan. 27, 1931. J. G. B. CHAMBERS 1,790,228
LIQUID DISPENSING RECEPTACLE
Filed Dec. 1, 1928
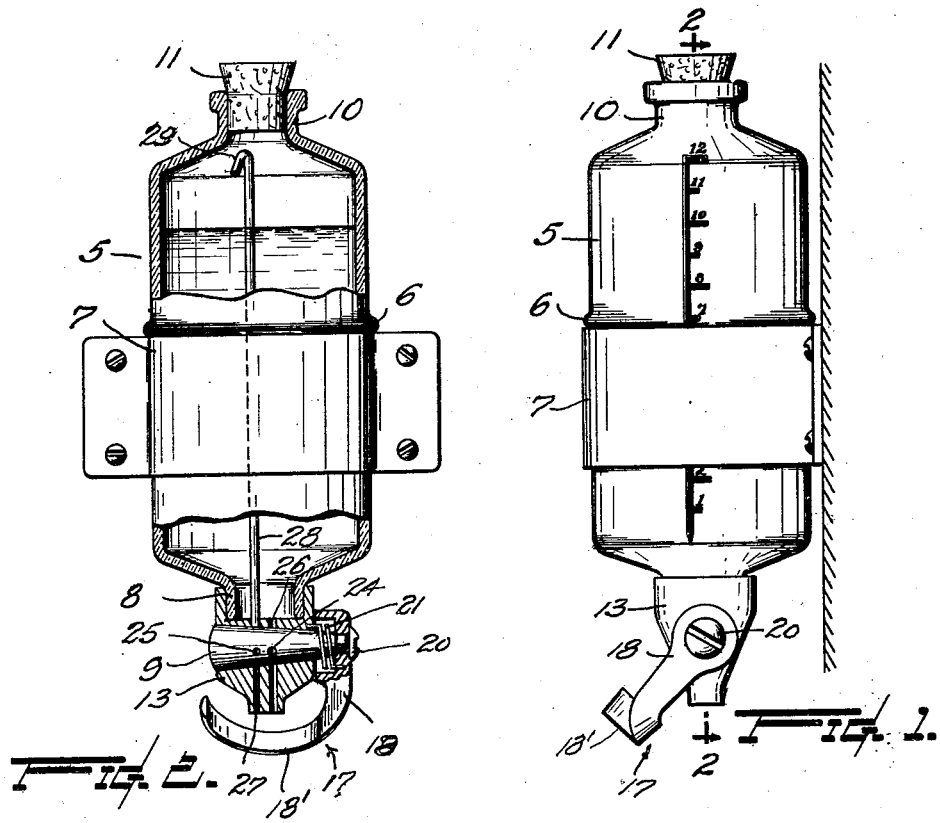
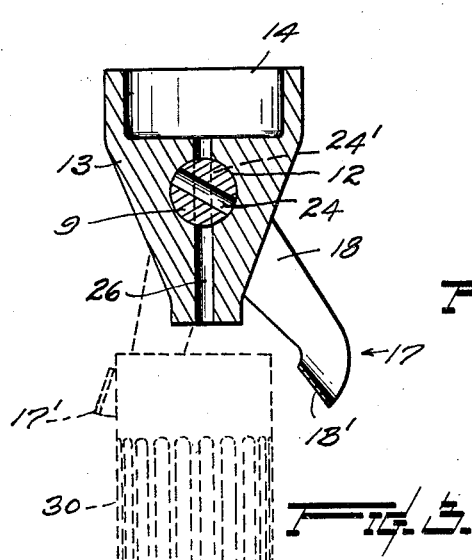
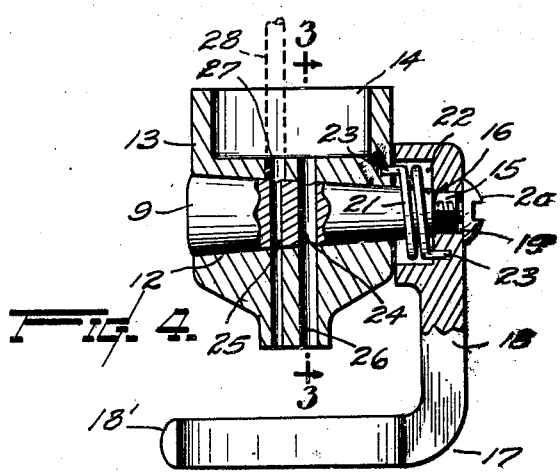
INVENTOR
James G. B. Chambers
BY
ATTORNEY Patented Jan. 27, 1931

1,790,228

UNITED STATES PATENT OFFICE

JAMES G. B. CHAMBERS, OF SEATTLE, WASHINGTON

LIQUID-DISPENSING RECEPTACLE

Application filed December 1, 1928. Serial No. 323,086.

This invention relates to apparatus for dispensing liquid; and its object is the provision of devices of this character for use, more particularly, in bath rooms and the like for conveniently supplying selected quantities of medicinal and saponary material from a reservoir therefor, as may be required in the preparation of remedial mixtures and washes.

More specific objects and advantages of the invention will appear in the following description.

The invention consists in a liquid container adapted to be attached to the wall of a room and provided with an outlet through which the contents are discharged, by gravitation, and a novel form of air-and-liquid valve for regulating the delivery of liquid from the container.

The invention further consists in the manner of mounting the regulating valve and to special means adapting the same to be readily controlled to withdraw desired quantities of liquid from the receptacle.

The invention further consists in the novel construction, adaptation and combination of parts hereinafter described and claimed.

In the accompanying drawing,—

Figure 1 is a side elevation of a device embodying my invention; Fig. 2 is a front elevation, partly in vertical transverse section on line 2—2 of Fig. 1; Fig. 3 is a longitudinal vertical section on line 3—3 of Fig. 4 of the valve and casing therefor, and illustrating by dotted lines the valve handle and a receptacle applied thereto in regulating the valve for drawing liquid from the container; and Fig. 4 is a view partly in front elevation and partly in transverse vertical section of the device shown in Fig. 3.

In said drawing the reference numeral 5 represents a liquid container, hereinafter called the "bottle", preferably of glass, hereinshown with a cylindrical body portion having a peripheral ridge 6 which serves as a shoulder to bear upon a bracket wall-attachment 7 for supporting the bottle.

At its lower end the bottle is provided with a tubular neck 8 to which is secured a vented liquid-delivery valve 9, to be presently described.

At its upper end the bottle is provided advantageously with a tubular neck 10 through which the bottle may be supplied or replenished with liquid; and for the opening therein is provided a removable closure or stopper 11. The delivery valve 9 above referred to is of the general type conventionally known as a plug valve extending horizontally through a bore 12 provided in a casing 13 which is secured to the outlet neck 8 of the bottle as by cementing the latter in a socket 14 provided therefor in the casing.

Said bore 12 is tapered from one side of the casing to its other side; and the valve 9 is correspondingly tapered within the bore to make a non-leakable fit therein. The smaller end of the valve protrudes from the casing and terminates in a polygonal extremity 15 (Fig. 4) extending beyond a ledge 16 provided on the valve. 17 represents a handle of an elbow shape for operating the valve, one arm 18 thereof being provided with a hole 19 of a shape to fit upon the polygonal portion 15 of the valve so that the latter will be turnable as a single piece by means of the handle. 20 represents a headed screw engaging in a threaded hole in the valve for securing the handle to the valve in opposition to an extensible coil spring 21 provided in a recess 22 of the handle arm 18 as shown in Fig. 4. Said spring acting between the casing and the handle serves to maintain the valve in close relation with the peripheral surface of the taper bore 12 which furnishes the valve seat.

The spring 21 is, furthermore, formed to provide at each end thereof finger 23 engaging apertures respectively in the casing and arm 18 of the handle for the valve, whereby the latter is normally held in rotary position such as to close the valve ports 24 and 25 with respect to the liquid and air ducts 26 and 27 respectively of the valve casing.

The ports 24 and 25 of the valve, as shown in Figs. 3 and 4, extend diametrically through the valve and are adapted to be brought through the medium of the handle 17 into register with the casing ducts 26 and 27.

The duct 26 is employed for drawing liquid from the bottle; and the other duct 27, is employed for bottle venting, that is, to admit air into the bottle to replace liquid therefrom or, more correctly, to admit air into the bottle to act against the upper surface of its liquid contents to effect delivery of the liquid when both ports of the valve are in their relatively open positions.

For this purpose the vent duct 27 is provided with an extension tube 28 reaching the upper end above the liquid level, said tube being desirably bent as at 29 (Fig. 2) to have its upper, or outlet, end directed downwardly to obviate the pouring of liquid into the vent tube when the bottle is being replenished with liquid through the top.

As shown the handle 17 is formed of an elbow shape with an arm 18¹ extending at about right angles to the arm 18 to permit the handle to be engaged by a receptacle such, for example, as a tumbler—indicated by dotted lines 30 in Fig. 3—moved in a plane transversely of the bottle axis to receive a charge of liquid from the bottle.

The spring 21 is adapted to normally retain the valve in a rotary position whereat the valve delivery port 24 occupies a position as represented by full lines in Fig. 3, and is turnable by means of the receptacle 30 being applied to the handle 17 to swing the same into its dotted line position 17¹, whereupon the valve port is in its dotted line position 24¹ Fig. 3 or as represented by full lines in Fig. 4, with regard to both ports 24 and 25. When thus influenced air is admitted through the vent connections to permit the liquid being discharged through the delivery port and ducts 24 and 26 respectively. When the receptacle is withdrawn the spring asserts its power to restore the valve into its closed relation.

The construction of the invention in its form now preferred by me and the manner of its operation will, it is believed, be understood from the foregoing description.

While the invention is useful to a number of applications, it is peculiarly adapted for use in conveniently supplying the cleansing agent for washes and gargles for the mouth and throat.

What I claim, is,—

1. A liquid dispensing device comprising in combination, a liquid container having a discharge opening in the bottom thereof and a peripheral ridge engageable as a shoulder against the upper edge of encasing vertically disposed wall elements of a bracket secured to a support, a casing secured about said discharge opening of the container to serve as a cap, said casing being provided with a valve seat, a liquid delivery duct and an air inlet duct provided in the casing, said inlet duct having an extension from said casing into the upper portion of the container, a valve for said seat, said valve being provided with ports for the respective ducts, a valve handle extending as an elbow to provide an operating arm disposed below said casing, means for securing the handle to said valve, and a spring connected to said casing and the valve handle for retaining the valve in non-leakable fit upon its seat, said spring also serving to yieldably retain the valve in position to have the ports thereof normally out of register with the ducts of said casing.

2. A liquid dispensing device comprising in combination, a liquid container having a discharge opening in the bottom thereof, a casing detachably sleeved over the open bottom of the container to serve as a cap thereof, said casing being provided with a valve seat, a liquid delivery duct and an air inlet duct, said inlet duct having an extension from said casing through said discharge opening into the upper portion of the container, a valve for said seat, said valve being provided with ports for the respective ducts, a valve handle, means for securing the handle to said valve, and a spring for retaining the valve in non-leakable fit upon its seat, said spring also serving to yieldably retain the valve in position to have the ports thereof normally out of register with the ducts of said casing.

3. A liquid dispensing device comprising in combination, a liquid container having a discharge opening in the bottom thereof, means adapted to secure the container to the wall of a room, a casing secured to the open bottom of the container to serve as a cap thereof, said casing being provided with a valve seat, a liquid delivery duct and an air inlet duct, said inlet duct having an extension from said casing into the upper portion of the container, a valve for said seat, said valve being provided with ports for the respective ducts, a valve handle, means for securing the handle to said valve, and a spring connected to said casing and the valve handle for retaining the valve in non-leakable fit upon its seat, said spring also serving to yieldably retain the valve in position to have the ports thereof normally out of register with the ducts of said casing.

4. A casing having an apertured socket in the upper end thereof for sleeved engagement over the discharge opening from a liquid container, said casing being provided with a tapered bore adapted to the reception of a tapered valve for seating engagement thereto, a liquid delivery duct and an inlet duct vertically disposed through said casing at opposite sides of said valve, ports vertically disposed through said valve and adapted to be rotated into registering engagement with the respective ducts, a handle secured to said valve, and a spring connected to said casing and said valve handle and adapted to retain the valve in non-leakable fit within the bore, said spring also serving to yieldingly retain the valve in normally inoperative position to have the ports out of register with the ducts of said casing.

Signed at Seattle, Washington, this 2nd day of October, 1928.

JAMES G. B. CHAMBERS.